(12) United States Patent
Artiuch et al.

(10) Patent No.: US 8,930,157 B2
(45) Date of Patent: Jan. 6, 2015

(54) TEMPERATURE COMPENSATED DIGITAL PRESSURE TRANSDUCER

(75) Inventors: Roman Leon Artiuch, Houston, TX (US); Paul Stephen Hooks, Halstead (GB); Nicolae Rau, Alba Iulia (RO)

(73) Assignee: Dresser, Inc., Addison, TX (US)

(*) Notice: Subject to any disclaimer, the term of this patent is extended or adjusted under 35 U.S.C. 154(b) by 512 days.

(21) Appl. No.: 13/401,050

(22) Filed: Feb. 21, 2012

(65) Prior Publication Data

US 2013/0218501 A1 Aug. 22, 2013

(51) Int. Cl.
*G06F 19/00* (2011.01)

(52) U.S. Cl.
USPC .......................................................... 702/98

(58) Field of Classification Search
CPC ....... A61N 1/025; A61N 1/056; A61N 1/057; A61N 1/08; A61N 1/37211
USPC .......................................... 702/98, 182–185
See application file for complete search history.

(56) References Cited

U.S. PATENT DOCUMENTS

| 4,390,956 | A | 6/1983 | Cornforth et al. |
| 5,253,532 | A | 10/1993 | Kamens |
| 7,073,392 | B2 | 7/2006 | Lull et al. |
| 7,258,016 | B2 | 8/2007 | Maitland, Jr. et al. |
| 2004/0098218 | A1 | 5/2004 | Ito et al. |
| 2006/0074570 | A1 | 4/2006 | Belke et al. |
| 2006/0149331 | A1* | 7/2006 | Mann et al. ............ 607/34 |
| 2008/0270046 | A1 | 10/2008 | Borenstein |
| 2009/0187356 | A1 | 7/2009 | Artiuch |

FOREIGN PATENT DOCUMENTS

WO  WO-99-49443  9/1999

OTHER PUBLICATIONS

PCT, International Search Report & Written Opinion, International Application No. PCT/US2013/026840, Filed, Feb. 20, 2013, Applicant, Dresser, Inc., Mailed, Jun. 27, 2013, 18 pages.

* cited by examiner

*Primary Examiner* — Edward Raymond
(74) *Attorney, Agent, or Firm* — Paul, Frank + Collins PC

(57) ABSTRACT

A digital pressure transducer includes a sensor, a memory component and a microprocessor. A correction algorithm and set of correction coefficients are provided and stored in the memory. An application applies the correction coefficients to convert digitized values to pressure values. The transducer may include a read/write port adapted to communicate with a computer terminal; and at least one read-only port adapted to communicate with a host device. A method of calibrating a digital pressure transducer includes storing a correction algorithm and correction coefficients in the digital pressure transducer separate from a host device.

22 Claims, 5 Drawing Sheets

TEMPERATURE COMPENSATED DIGITAL PRESSURE TRANSDUCER

TECHNICAL FIELD

The subject matter disclosed herein relates generally to pressure transducers and more specifically to temperature compensated digital pressure transducers for use in applications requiring a high degree of accuracy.

BACKGROUND

Pressure transducers are widely used in a myriad of applications. Among the uses of pressure transducers are the indirect measurement of other variables such as fluid/gas flow, speed, water level, and altitude. There are a variety of technologies that have been used for pressure transducers, and these technologies vary in performance, and cost. The typical analog pressure transducer is characterized by relation between input pressure and an output analog signal. As with all measuring instruments pressure transducers must be calibrated. Calibration is defined as a set of operations that establish, under specified conditions, the relationship between the values of quantities indicated by a measuring instrument or measuring system (readings) and the corresponding values realized by standards (true value). Once the relationship between the readings and true values is known the readings may be adjusted to provide a more accurate value. However the relationship between the input pressure and the output analog signal is significantly affected by temperature. Consequently, at any given pressure, variations in temperature will cause errors to be introduced in the output signal, which if left uncompensated, will cause errors leading to inaccurate pressure readings.

Compensation for temperature variations may be accomplished in a variety of ways. For example, an analog pressure transducer may be placed in a chamber where temperature and pressure can be changed. Various known pressures are applied as transducer input and output signals are measured then temperature is changed and the process is repeated. As result of this process, tables are created that describe relation between input pressure and output signal. The relation between input pressure and output analog signal may be described by a mathematical function. There is a possibility to define a few mathematical functions that describe a relation between input pressure and output signal for various temperatures during an iterative calibration process. In general, accuracy of the mathematical function depends from the number of created tables, the size of the tables and the interpolation technique. However, with this approach temperature information has to be sent to a device that is used to select the correct function to adjust pressure values based on temperature values. This method is impractical because it is difficult to define the function if the measured temperature does not match the values of temperature for which the transducer was calibrated.

Another approach is to obtain multiple readings at multiple known pressures over a range of temperatures. Tables of these values may be created and a mathematical interpolation technique may be applied to create a correction algorithm with some coefficients. If these coefficients are known and the temperature value is known, then output signal from the pressure transducer can be measured and then by using interpolation technique the temperature compensated pressure value is calculated. In general, accuracy of the function depends from the number of created tables and their size but also from interpolation technique.

Commercially available pressure transducers include transducers that provide pressure and temperature values in analog form (e.g. voltage). For these devices correction algorithm coefficients may be stored in EEPROM located in pressure transducer. The user of the pressure transducer has to know the mathematical function describing relation between input pressure and output signal. Usually, a pressure transducer is connected to a host device. An example of a host device is a volume corrector in gas distribution lines, or a flow computer used in gas transmission lines, or similar end user electronic hardware. After the pressure transducer is connected to the host device correction algorithm coefficients have to be provided to the host device. Usually the host device is provided with analog/digital converter that converts analog signals into digital form. The digital information is provided to a microprocessor in the host device that calculates a temperature compensated pressure value based on mathematical function and correction algorithm coefficients.

Another type of pressure transducer provides digital outputs to the host device. These pressure transducers include an analog/digital converter. Output signals in digital form are sent directly into inputs of an end user microprocessor. Correction algorithm coefficients may be stored in pressure transducer. The user of that type of pressure transducer has to know the mathematical function describing relation between input pressure and output signal. Usually, after that type of pressure transducer is connected for the first time into the host device the correction algorithm coefficients are sent from the pressure transducer to the host device. The microprocessor in the host device then calculates a temperature compensated pressure value based on an applied correction algorithm and coefficients obtained during calibration process.

One application of a digital pressure transducer is as a component of a host device comprising, for example a volume corrector in gas distribution lines, or a flow computer used in gas transmission lines. The measurement of volume flowing through a pipeline requires correction for the effects of pressure and temperature on the gas volume passing through the measuring instrument. The degree of accuracy of volume correctors or flow computers is regulated by government authorities. Charles Law and Boyle's Law are applied to adjust for pressure and temperature effects to the gas. The gas volume is converted to "Standard Pressure and Temperature values." Thus, to determine the volume of gas exposed to varying conditions of temperature and pressure flowing through a pipe line accurate temperature compensated pressure measurements are required. There are three temperatures that may be measured in this type of application. These temperatures include (a) ambient temperature (volume correctors of this type may operate over a range of ambient temperatures of −40° C. to +70° C.), the temperature of the gas flowing through the pipe, and the temperature of the pressure sensing elements.

Existing pressure transducers have a number of problems when used in connection with instruments or hardware such as volume correctors. One problem is that in order to accurately compensate for temperature, the temperature of the pressures sensing element should be used. Another problem is that when there is a reading that indicates a malfunction, the user is unable to distinguish whether the malfunction is in the pressure transducer or in the host device. Another problem is that over time, the relationship between the inputs pressure in the sensor output may change, and consequently, the complexity, expense and sometimes technical inability to recalibrate the pressure transducer in the field poses a significant problem. Another problem is that if the temperature adjustment of the signal is carried out in the host device, then in the case of a malfunction in the pressure transducer, the user must replace not only the pressure transducer but also the host device. In some cases, even if it is determined that the transducer failed, the transducer cannot be replaced because metrological authorities cannot be sure that whole pressure measurement is accurate. in such a case, the new transducer would have to be tested against some reference pressure and calibrated.

BRIEF DESCRIPTION OF THE INVENTION

In accordance with one exemplary non-limiting embodiment, the invention relates to a digital pressure transducer including at least one sensor that provides an analog output signal related to the pressure and temperature of a sensing element. The transducer also includes at least one memory component for storing a set of correction algorithm coefficients derived for the specific digital pressure transducer and at least one analog to digital converter that converts the output signal to a digitized output signal. Also included in the digital pressure transducer are a microprocessor and at least one application that converts the digitized output signal to a pressure value using the applied correction algorithm and coefficients obtained during calibration process. The transducer is provided with at least one read/write port adapted to communicate with a computer terminal and a host device; and at least one read-only port adapted to communicate with a host device. A power supply is also included In another embodiment, a method of recalibrating a digital pressure transducer is provided. The method includes receiving a recalibration instruction through a read/write port in the transducer; sending a digital pressure value to a device instructing the recalibration through the read/write port; receiving an adjustment value through the read/write port; and applying the adjustment value.

In another embodiment, a method of recalibrating a digital pressure transducer is provided. The method includes initiating a recalibration application in a device; providing a user password; sending recalibration instructions to a read/write port in the digital pressure transducer; receiving a digital pressure value from the digital pressure transducer; calculating an adjustment value; and sending the adjustment value to the read/write port in the digital pressure transducer.

In another embodiment, a method of calibrating a digital pressure transducer is provided. The method includes subjecting the digital pressure transducer to a range of known temperatures and pressures; receiving pressure values from the digital pressure transducer; applying a correction algorithm; determining correction algorithm coefficients for the digital pressure transducer; and instructing storage of the correction algorithm and the correction algorithm coefficients in the digital pressure transducer.

In another embodiment, a system including a host device and a digital pressure transducer is provided. The digital pressure transducer includes at least one sensor that provides an analog output signal related to the pressure and temperature of a fluid. The digital pressure transducer also includes at least one memory component storing a set of correction algorithm coefficients derived for the specific digital pressure transducer; at least one analog to digital converter that converts the output signal to a digitized output signal and a microprocessor. The digital pressure transducer also includes at least one application that converts the digitized output signal to a pressure value using the correction algorithm coefficients; at least one read/write port; and at least one read-only port. In this embodiment, the digital pressure transducer is separate from the host device.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
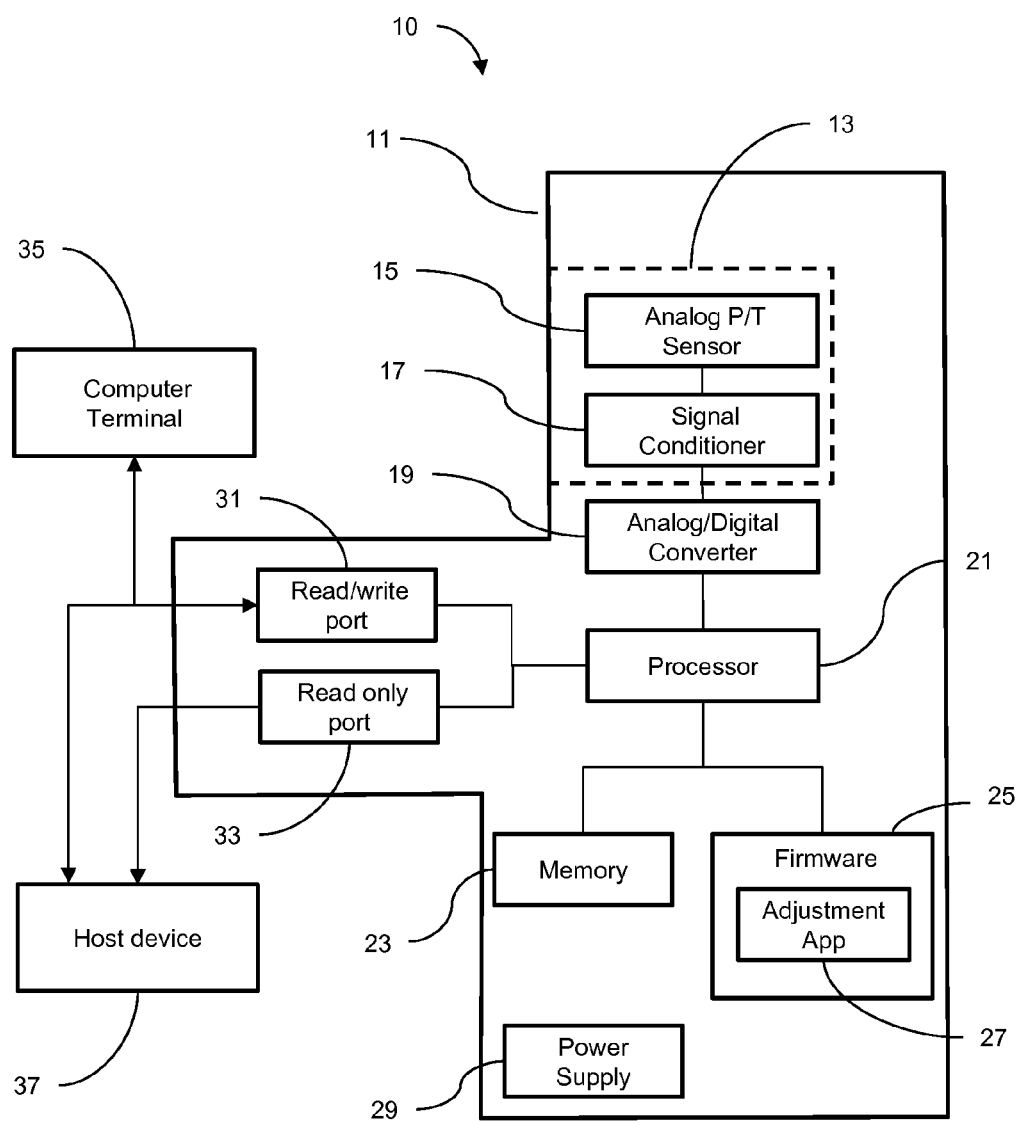
FIG. 1 illustrates a system including a digital pressure transducer in accordance with one embodiment of the present invention.

Illustrated in FIG. 1 is a system for measuring pressure 10 in accordance with one embodiment of the present invention. The system for measuring pressure 10 includes a digital pressure transducer 11. The digital pressure transducer 11 includes a pressure and temperature sensing component 13, which may comprise an analog pressure and temperature sensor 15 and a signal conditioner 17. The analog pressure and temperature sensor 15 may be one of several known types of sensors, such as bonded strain gages connected in a Wheatstone bridge configuration. The analog pressure and temperature sensor 15 provides an output that is directly proportional to the pressure and also may be used to measure temperature. Other types of sensors may include capacitive sensors electromagnetic sensors and the like. A combination of a pressure sensor and a temperature sensor may also be used. The signal conditioner 17 manipulates the analog signal from the analog pressure and temperature sensor 15 to be suitable as an input to an analog/digital converter 19. The analog/digital converter 19 is a device that converts the analog output received from the signal conditioner 17 into a digital number proportional to the magnitude of the analog output.

The digital pressure transducer 11 also includes a processor 21 and memory 23. Depending upon the particular embodiment, processor 21 may be implemented or performed with a general purpose processor, a microprocessor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The processor 21 may be realized as a microprocessor, a controller, a microcontroller, or a state machine. The processor 21 may also be implemented as a combination of computing devices, e.g., a combination of a digital signal processor and a microprocessor, a plurality of microprocessors, one or more microprocessors in conjunction with a digital signal processor core, or any other such configuration. Memory 23 is preferably an EEPROM but may be any type of memory including, RAM, ROM, or flash memory.

Firmware 25 may also be provided to control certain aspects of the functionality of the digital pressure transducer 11, such as the implementation of an adjustment application 27 that adjusts outputs to correct for temperature variations. The adjustment application 27 may implement a variety of mathematical interpolation procedures that might be applied to create a mathematical function that describes relation between input pressure and temperature and output signal. In some cases the mathematical function may be described by polynomials with the set of coefficients.

The digital pressure transducer 11 may be provided with a power supply 29, which in one embodiment may be in the form of a battery or power supplied from a host device 37.

The digital pressure transducer 11 may be provided with the read/write port 31 and a read only port 33. The read/write port 31 may be used to communicate with a computer (user) terminal 35 and/or with a host device 37. The read only port 33 may be used to communicate with the host device 37. Computer terminal 35 may be a digital processor such as a microprocessor. The host device 37 may be an instrument such as for example a volume corrector used in gas distribution lines, or a flow computer used in gas transmission lines. In one embodiment the read/write port 31 maybe a USB port. The read-only port 33 may be used to communicate with the host device 37 using an electronic component level protocol. Various methods are typically used for communication between devices at the electronic component level using protocols such as USB, IEEE 1394, Rs 232, I2C, etc. The I2C protocol was developed for communication between integrated circuit (IC) chips through two bus lines. Computer terminal 35 may access application software 36 that may include applications for data interpolation and interrogation of the digital pressure transducer 11. Computer terminal 35 may be used to provide data and programs to the digital pressure transducer 11, such as for example calibration data, value adjustment applications and recalibration data.

In one embodiment the some or all of the components of the system for measuring pressure 10 may be embodied in a single chip. Examples of chips that may be used in such cases are "system on a chip" integrated circuits and programmable system on a chip integrated circuits. A typical system on a chip may include a microcontroller, microprocessor or one or more digital signal processor cores. The system on a chip may also incorporate memory (e.g. ROM, RAM, EEPROM and flash memory), peripherals, external interfaces including, analog interfaces and the like. Additionally, the system on a chip may include software. A programmable system on a chip may provide integrated configurable analog and digital peripheral functions, memory, and a microcontroller on a single chip.

Figure 2:
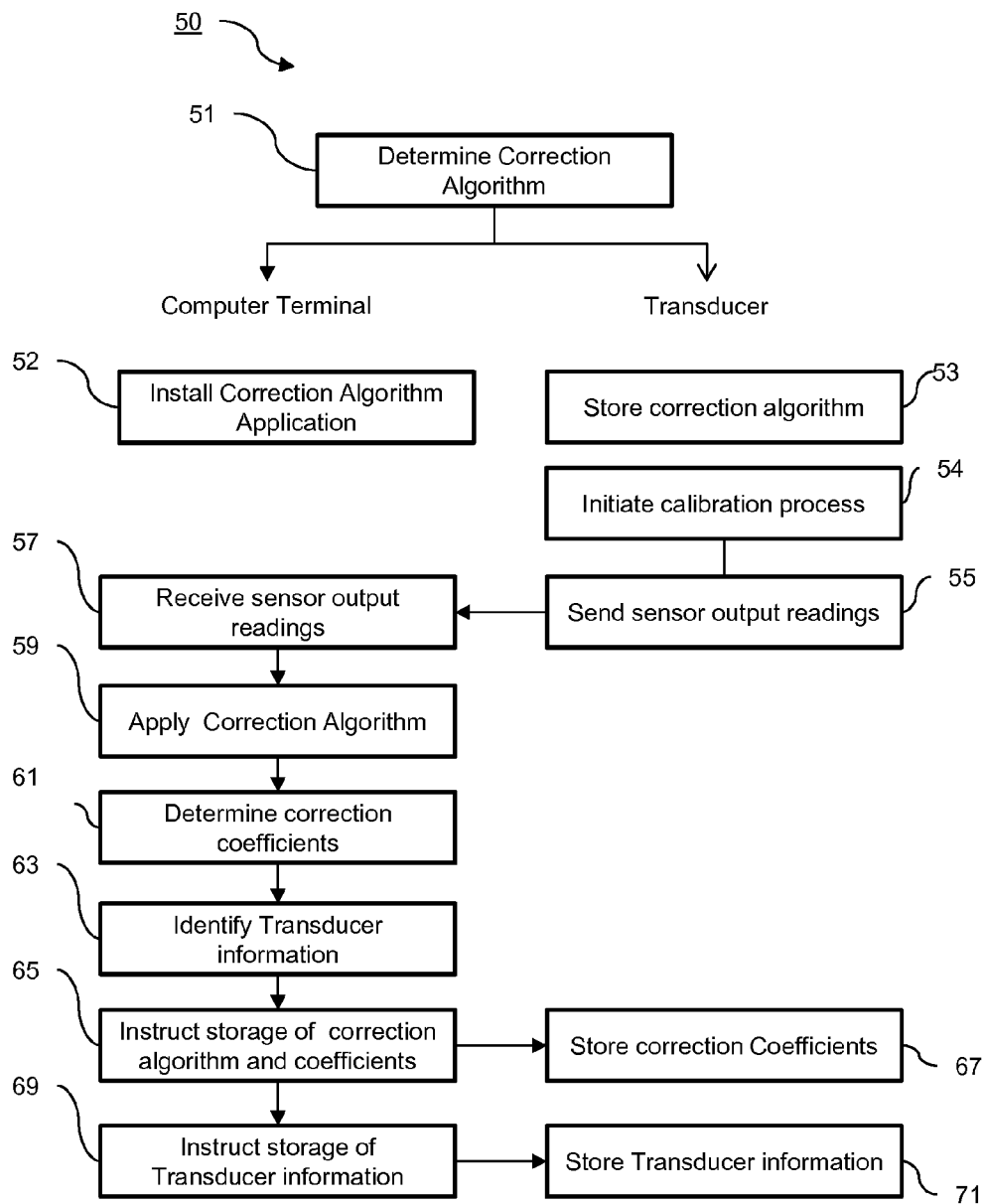
FIG. 2 is a flow diagram of a process for setting up a digital pressure transducer in accordance with an embodiment of the present invention.

Illustrated in FIG. 2 is an embodiment of a methodology for instrument set-up 50 for the digital pressure transducer 11 that may be implemented with the computer terminal 35. An initial element in the method is to determine the correction algorithm that will be applied to the data and to install the correction algorithm application (method element 52). The determination of the correction algorithm involves the balancing of data quality and performance factors such as transducer battery power and life. One of the simplest approaches to calibration of transducers is a one-point correction. One-point correction is based on the assumption that the response of a sensor is linear. However, for the pressure and temperature ranges that the digital pressure transducer 11 is subjected to, the response of the analog pressure and temperature sensor 15 is a non-linear multidimensional function. Consequently at least a two-point correction algorithm using a higher order (2 or higher) polynomial is desired. A correction algorithm can be derived for non-linear data sets by the use of polynomial interpolation. A set of data points may be replaced with an approximate polynomial function. This requires the storage of a reduced number of polynomial correction algorithm coefficients and a curve fitting computation that can be implemented by digital processing devices. In some embodiments a second, third or fourth order polynomial may be used. A correction algorithm application may be programmed and installed in the computer terminal 35 (method element 52) and in the transducer (method element 53).

The method may include initiating a calibration process (method element 54) disclosed in more detail below. The digital pressure transducer 11 may send sensor output readings to the computer terminal 35 (method element 55). Upon receipt of the sensor output readings (method element 57) the computer terminal 35 may apply the correction algorithm (method element 59) to the data for calibration purposes From the application of the correction algorithm, a set of correction coefficients is determined (method element 61). Transducer related information such as the range digital pressure transducer 11, the serial number digital pressure transducer 11, and version of the firmware included in the digital pressure transducer 11 may be identified (method element 63). The user, through the computer terminal 35 may then instruct the storage of the correction algorithm and correction coefficients into the digital pressure transducer 11 (method element 65). The digital pressure transducer 11 then may store the algorithm and correction coefficients (method element 67). Instructions to store transducer related information may be provided through terminal 35 (method element 69). The transducer related information may then be stored in the digital pressure transducer 11.

Figure 3:
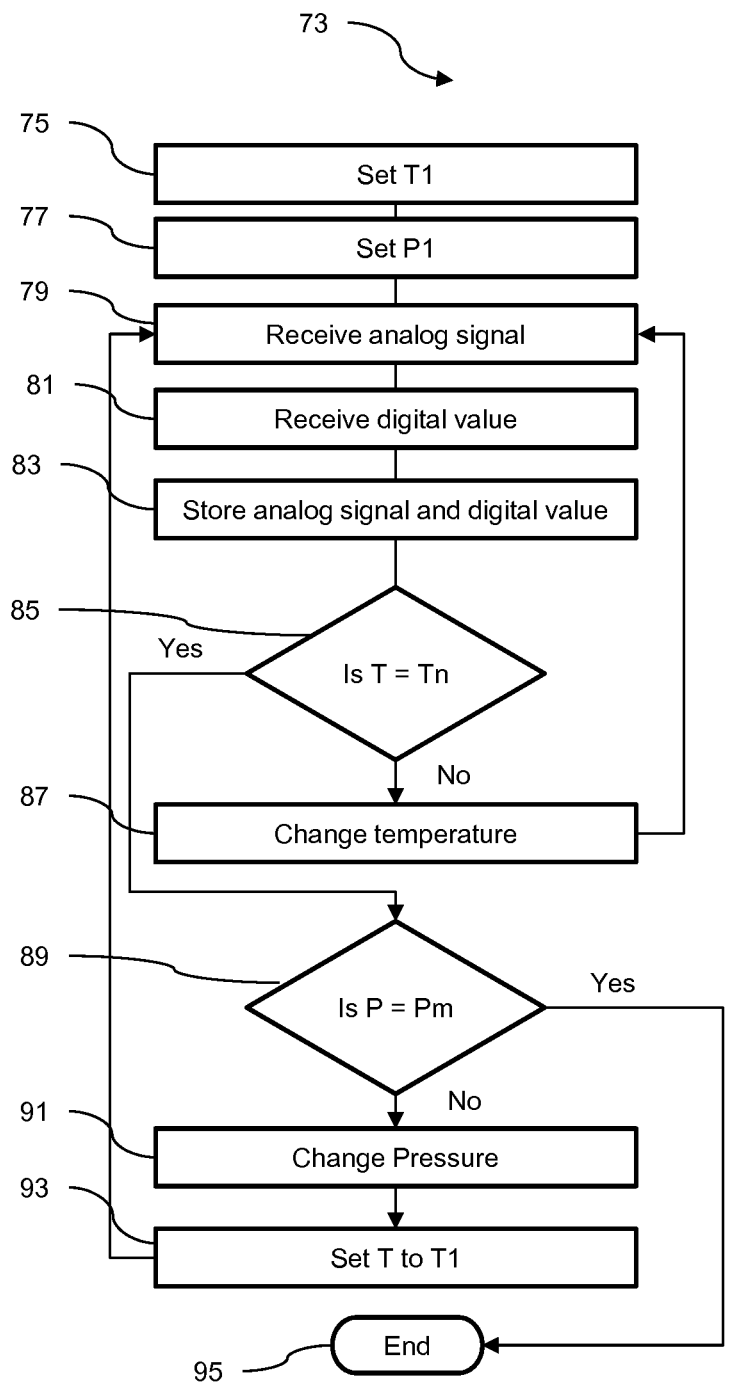
FIG. 3 is a flow diagram of a process for calibrating a digital pressure transducer in accordance with an embodiment of the present invention.

Illustrated in FIG. 3 is an example of a methodology for accomplishing the calibration process 73. The digital pressure transducer 11 is placed in a controlled pressure and temperature environment with a starting sensor temperature (temperature of the analog pressure and temperature sensor 15) T1 (method element 75) and a starting pressure P1 (method element 77). The temperature may be changed in predetermined increments from T1 to Tn and the pressure may be changed in predetermined increments from P1 to Pm. The initial and end temperature and pressure are determined by the operational range of the digital pressure transducer 11. The digital pressure transducer 11 may provide an analog output signal (method element 79) and a digital value associated with the output signal (method element 81). The values of the analog output signal and digital value may be stored (method element 83). A determination may then be made as to whether the temperature being tested is the end temperature Tn (method element 85). If the temperature at which the digital pressure transducer 11 is being tested is not Tn, then the temperature is changed by the predetermined increment (method element 87) and measurements are made and values for the analog signal and digital values may be recorded. If the temperature at which the digital pressure transducer 11 is being tested is the end temperature Tn then a determination of whether the pressure being tested is the end pressure Pm (method element 89) is made. If the pressure being tested is not the final pressure Pm, then the pressure is changed by the predetermined increment (method element 91) and the temperature is reset to the initial temperature T1 (method element 93). If the pressure being tested is the final pressure Pm then the calibration process ends (method element 95). The results of this methodology are tables correlating analog signal output at a certain temperature with pressure. These tables may be used to identify the coefficients for the correction algorithm to be used with the digital pressure transducer 11.

Figure 4:
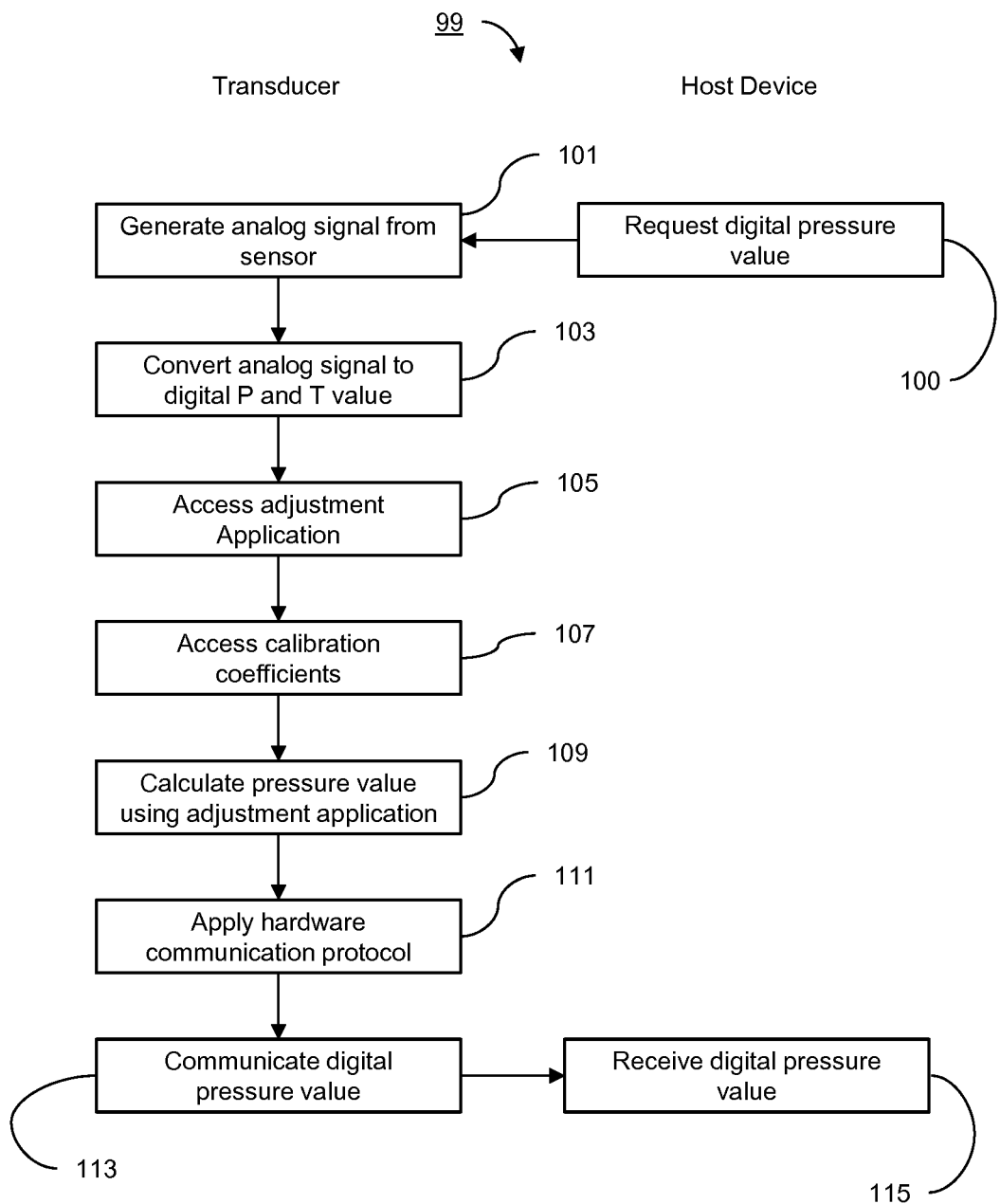
FIG. 4 is a flow diagram of a process implemented by a digital pressure transducer in accordance with an embodiment of the present invention.

Illustrated in FIG. 4 is an embodiment of a method 99 implemented by the digital pressure transducer 11 in combination with the host device 37. The host device 37 may send a request for a temperature adjusted digital pressure value to the digital pressure transducer 11(method element 100). An analog signal is generated from the analog pressure and temperature sensor 15 (method element 101) which may then be converted into a digital pressure and temperature value (method element 103). The processor 21 accesses the adjustment application 27 (method element 105) and the correction algorithm coefficients (method element 107). The processor 21 then calculates a pressure value by applying the calibration application and the correction algorithm coefficients (method element 109). The resulting digital data may then be formatted in a hardware communication protocol (method element 111) in the formatted digital value is communicated to the host device 37 (method element 113). The formatted digital values are received by the host device 37 for further processing (method element 115).

Figure 5:
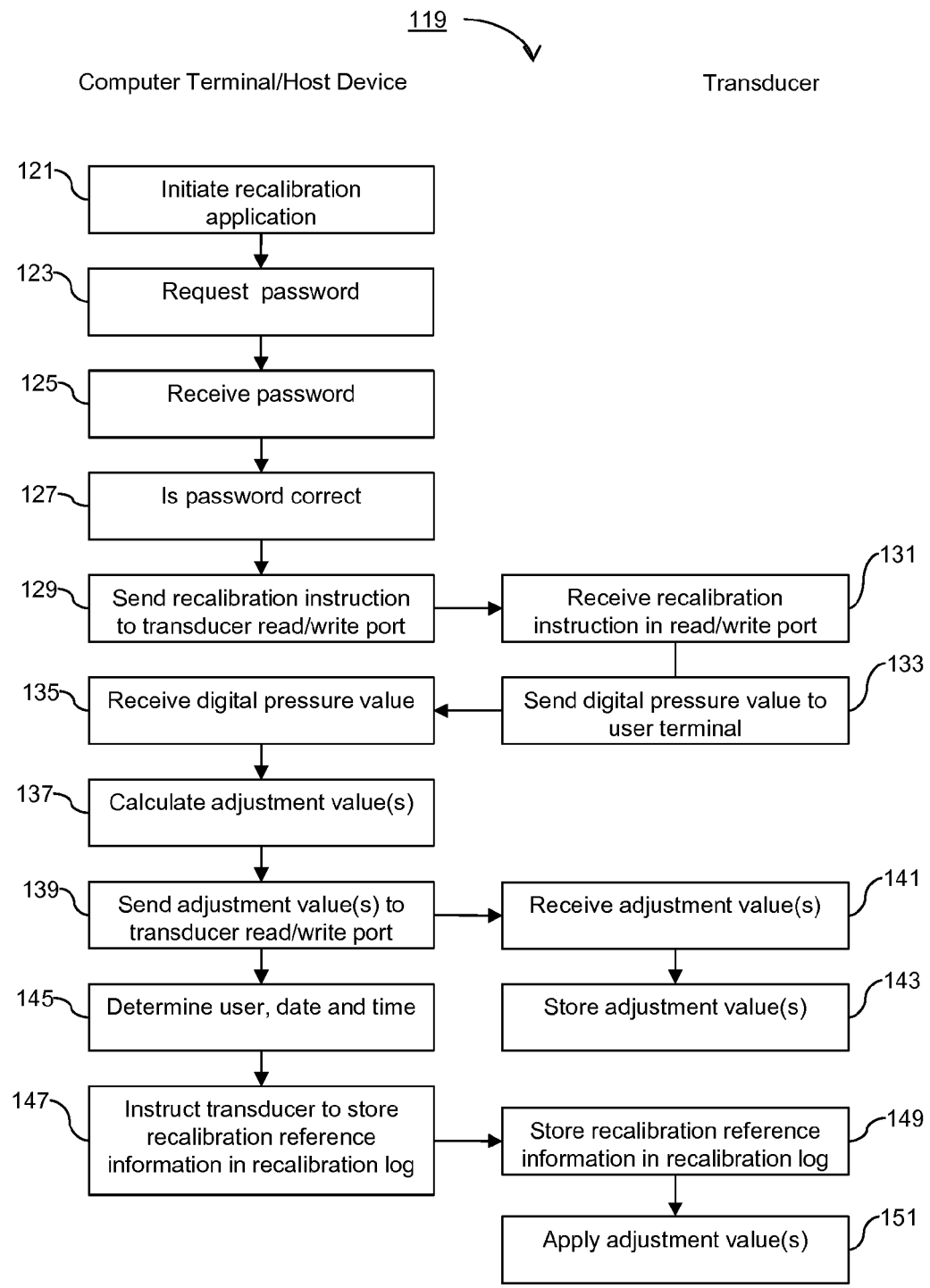
FIG. 5 is a flow diagram of a process for calibrating a digital pressure transducer in accordance with an embodiment of the present invention.

Illustrated in FIG. 5 is a recalibration methodology 119 for the digital pressure transducer is 11 that may be implemented using the computer terminal 35 or the host device 37. In one embodiment, recalibration is performed in the field. A recalibration application may be initiated in computer terminal 35 or the host device 37 (method element 121). Security may be provided in the application and a request for password may be presented to the user (method element 123). Upon receipt of the password (method element 125), the password is checked (method element 127) and recalibration instructions may be sent to the read/write port 31 (method element 129) by either the computer terminal 35 or the host device 37 (external device requesting recalibration). The digital pressure transducer receives the recalibration instructions through the read/write port 31 and may provide a digital pressure value to the computer terminal 35 (or the host device 37) associated with a known pressure (method element 133). The pressure values received by the computer terminal 35 or the host device 37 (method element 135), and one or more adjustment values are calculated (method element 137). The adjustment value(s) may be calculated using know recalibration methodology. For example, one point recalibration may provide an offset to correct the pressure values. Another method may be used such as two point recalibration (bracketing calibration) where the two calibration points are sued to bracket the range of values that will be measured. Two point recalibration may require some interpolation function to generate adjustment values. The adjustment value(s) is/are sent to the transducer read/write port 31 (method element 139) and is received by the transducer (method element 141). The adjustment value (s) may then be stored into memory 23 (method element 143). Optionally, the adjustment values may be calculated by the processor 21 in the digital pressure transducer 11. Additionally, other recalibration reference information such as user identification, and date and time of recalibration are may be identified (method element 145) and instructions provided to the digital pressure transducer 11 to store the recalibration reference information into a recalibration log (method element 147). The instructions would be received by the digital pressure transducer 11 wherein the recalibration reference information will be stored in a recalibration log (method element 149). Thereafter the digital pressure transducer 11 would apply the adjustment value (method element 151). Additional optional elements may be employed in this method. For example, the processor 21 may be programmed to allow a limited number of entries (recalibrations). If the limit is reached then recalibrations will not be permitted until this log is downloaded into the computer terminal 35. In that case the event of downloading is registered in recalibration log for traceability.

The methods of the various embodiments may be embodied as one or more computer programs. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

The configuration of an embodiment of the digital pressure transducer 11 serves to deliver digital pressure value that can be verified outside host device 37. The values may be sent to a computer terminal 35 that is not connected to the host device 37. Thus recalibration may be accomplished by the host device 37 or a separate computer terminal 35. The configuration of an embodiment of the digital pressure transducer 11 also provides for temperature correction using the temperature of the pressure and temperature sensing component 13 to be performed by the digital pressure transducer 11 rather than the host device 37.

The configuration of an embodiment of the digital pressure transducer 11 serves to maintain the digital pressure transducer 11 separate from the host device 37. Correction coefficients may be stored in the digital pressure transducer 11 and the correction processing may be implemented in the digital pressure transducer 11. In a situation where the digital pressure transducer 11 fails, there is no need to replace the host device.

The configuration of the digital pressure transducer 11 provides additional functionality such as for example the ability to inspect the digital pressure transducer 11 by connecting the computer terminal 35 through the read/write port 31. The temperature compensated pressure value may then be presented on the screen of the computer terminal 35. Additionally, configuration of the digital pressure transducer 11 provides the ability to periodically check if the correction algorithm coefficients have been changed (intentionally or by not controlled reasons e.g. electromagnetic radiation). One of the methods could be cyclic redundancy check (CRC). Any other method such as a checksum function may also be used. The checksum function takes a value generated from an arbitrary block of data and compares it to a recomputed value. If the checksums do not match then the data has been altered. CRC values may be stored in the digital pressure transducer 11 and if newly calculated value does not match previously stored values then the digital pressure transducer fault is set. Checking of the calibration may be done on a periodic basis (e.g. every one hour).

The configuration of the digital pressure transducer 11 provides an additional functionality with regard to the re-use of the host device 37. For example, an end user may decide that the host device 37 (e.g. volume corrector or flow computer) should be used in another installation. In such an event, a new digital pressure transducer may be installed with the re-used host device 37 without the need of metrological verification, even if the pressure in the other installation is different. The reason for this is that the accuracy of the digital pressure transducer 11 was verified prior installation.

The steps of a method or algorithm described in connection with the embodiments disclosed herein may be embodied in hardware, in firmware, in a software module executed by a processor, or in any practical combination thereof. A software module may reside in RAM memory, flash memory, ROM memory, EPROM memory, EEPROM memory, registers, a hard disk, a removable disk, a CDROM, or any other form of storage medium known in the art. In this regard, memory 23 can be coupled to processor 21 such that processing unit processor 21 can read information from, and write information to, memory 23. In the alternative, memory 23 may be integral to processor 21.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A digital pressure transducer, comprising:
    a microprocessor;
    at least one memory component coupled with the microprocessor, the at least one memory component storing a correction algorithm and a set of coefficients obtained during a calibration process for the specific digital pressure transducer;
    at least one analog to digital converter coupled with the microprocessor
    at least one sensor coupled with the at least one analog to digital converter, wherein the at least one sensor provides an analog output signal related to the pressure and temperature of a pressure sensing element, and wherein the analog to digital converter is configured to convert the analog output signal to a digitized output signal;
    a plurality of ports coupled with the microprocessor, the plurality of ports comprising,
        at least one read/write port adapted to communicate with a computer terminal and a host device;
        at least one read-only port adapted to communicate with the host device,
    wherein the microprocessor couples with firmware that is configured to implement an adjustment application to convert the digitized output signal to a pressure value using the correction algorithm and the set of coefficients obtained during the calibration process, and
    wherein the read-only port is adapted to communicate with the host device with an electronic component level communication protocol.

2. The digital pressure transducer of claim 1, wherein the host device is a volume corrector.

3. The digital pressure transducer of claim 1, wherein the read/write port comprises a USB port.

4. The digital pressure transducer of claim 1, further comprising an application configured to receive an adjustment value from the host device.

5. The digital pressure transducer of claim 4, wherein the application configured to receive an adjustment value adjusts the pressure value based on the adjustment value.

6. The digital pressure transducer of claim 5, further comprising a recalibration log.

7. A method of recalibrating a digital pressure transducer, said method comprising:
    receiving, at the digital pressure transducer, a recalibration instruction through a read/write port in the digital pressure transducer;
    receiving, at the digital pressure transducer, recalibration reference information through the read/write port;
    storing, at the digital pressure transducer, the recalibration reference information in a recalibration log;
    sending, from the digital pressure transducer, digital pressure values to a computer terminal through the read/write port;
    receiving at the digital pressure transducer, an adjustment value through the read/write port in the digital pressure transducer, the adjustment value relating to the digital pressure values; and
    applying, at the digital pressure transducer, the adjustment value to modify a value for a reading from the digital pressure transducer.

8. The method of claim 7, wherein the recalibration information comprises user identification, and date and time of recalibration.

9. A method of recalibrating a digital pressure transducer, said method comprising:
    initiating a recalibration application in an external device;
    using the external device, sending recalibration instructions to a read/write port in the digital pressure transducer;
    using the external device, sending recalibration reference information to the read/write port in the digital pressure transducer;
    receiving, at the external device, a digital pressure value from the digital pressure transducer;
    calculating, at the external device, an adjustment value;
    sending, from the external device, the adjustment value to the read/write port in the digital pressure transducer, the adjustment value relating to the digital pressure value,
    wherein the adjustment value is configured to modify a value for a reading from the digital pressure transducer.

10. The method of claim 9, wherein the recalibration reference information comprises user identification and date and time of recalibration.

11. The method of claim 9, further comprising instructing the digital pressure transducer to store the recalibration reference information in a recalibration log.

12. A method of calibrating a value measured by a digital pressure transducer said method comprising:
    determining, at a host device, a correction algorithm using performance factors for the digital pressure transducer;
    receiving, at the host device, pressure values from the digital pressure transducer that correspond with a range of known temperatures and pressures;
    determining, at the host device, correction algorithm coefficients for the digital pressure transducer from the pressure values;
    receiving, at the digital pressure transducer, the correction algorithm, the correction algorithm coefficients, and transducer related information;
    storing the correction algorithm, the correction algorithm coefficients, and the transducer related information on the memory of the digital pressure transducer; and
    applying, at the digital pressure transducer, the correction algorithm and the correction algorithm coefficients to calculate a value for a reading from the digital pressure transducer.

13. The method of claim 12, wherein the correction algorithm comprises a polynomial interpolation algorithm.

14. The method of claim 12, wherein the correction algorithm coefficients comprise interpolation polynomial coefficients.

15. A system, comprising:
   a host device, wherein the host device is a volume corrector; and
   a digital pressure transducer separate from the host device, comprising:
      a microprocessor;
      at least one memory component storing a set of correction algorithm coefficients derived for the specific digital pressure transducer;
      at least one analog to digital converter coupled with the microprocessor that converts the analog output signal to a digitized output signal;
      at least one sensor coupled with the at least one analog to digital converter,
   wherein the at least one sensor provides an analog output signal related to the pressure of a fluid and the temperature of the sensor;
      a plurality of ports coupled with the microprocessor, the plurality of ports comprising,
         at least one read/write port; and
         at least one read-only port,
   wherein the microprocessor couples with firmware that is configured to implement an adjustment application to convert the digitized output signal to a pressure value using the correction algorithm coefficients.

16. The system of claim 15, further comprising at least one subsystem that instructs the digital pressure transducer to store the correction algorithm coefficients.

17. The system of claim 15, further comprising at least one subsystem that recalibrates the digital pressure transducer.

18. The system of claim 15, further comprising at least one subsystem that communicates the pressure value to the host device using an electronic level communication protocol.

19. The system of claim 15, wherein the read/write port is a USB port.

20. The system of claim 15, further comprising at least one application that determines whether the correction algorithm coefficients have changed.

21. The system of claim 20, wherein the application that determines if the correction algorithm coefficients have changed sets a fault if the correction algorithm coefficients have been changed for not controlled reasons.

22. The system of claim 15, wherein one or more of the least one sensor, the at least one memory component, the at least one analog to digital converter, the microprocessor, the least one application, the at least one read/write port; and at least one read-only port are integrated into a single chip.

* * * * *